United States Patent
Pochon et al.

(10) Patent No.: US 8,819,436 B2
(45) Date of Patent: Aug. 26, 2014

(54) PROTECTION METHOD, DECRYPTION METHOD, RECORDING MEDIUM AND TERMINAL FOR SAID PROTECTION METHOD

(75) Inventors: Nicolas Pochon, Paris (FR); Quentin Chieze, Paris (FR); Stephane Lafranchi, Paris (FR)

(73) Assignee: Viaccess, Paris la Defense (FR)

( * ) Notice: Subject to any disclaimer, the term of this patent is extended or adjusted under 35 U.S.C. 154(b) by 53 days.

(21) Appl. No.: 13/806,207

(22) PCT Filed: Jun. 20, 2011

(86) PCT No.: PCT/EP2011/060258
§ 371 (c)(1),
(2), (4) Date: Dec. 21, 2012

(87) PCT Pub. No.: WO2011/161066
PCT Pub. Date: Dec. 29, 2011

(65) Prior Publication Data
US 2013/0132725 A1   May 23, 2013

(30) Foreign Application Priority Data
Jun. 22, 2010 (FR) ........................ 10 54943

(51) Int. Cl.
*H04L 9/08* (2006.01)
*H04N 21/835* (2011.01)
*H04N 21/4623* (2011.01)
*H04N 21/4405* (2011.01)
*H04L 29/06* (2006.01)

(52) U.S. Cl.
CPC ........... *H04L 9/088* (2013.01); *H04L 2209/603* (2013.01); *H04N 21/835* (2013.01); *H04L 2463/101* (2013.01); *H04N 21/4623* (2013.01); *H04N 21/4405* (2013.01); *H04L 63/0485* (2013.01); *H04L 2463/061* (2013.01)
USPC .......................................................... 713/171

(58) Field of Classification Search
USPC .......................................................... 713/171
See application file for complete search history.

(56) References Cited

U.S. PATENT DOCUMENTS

2009/0238363 A1 * 9/2009 Tronel et al. ................... 380/239
2009/0296926 A1 * 12/2009 Perlman ........................... 380/44

FOREIGN PATENT DOCUMENTS

EP  0899956  3/1999

* cited by examiner

*Primary Examiner* — Kambiz Zand
*Assistant Examiner* — Aubrey Wyszinski
(74) *Attorney, Agent, or Firm* — Occhiuti & Rohlicek LLP

(57) ABSTRACT

Protecting data transmission, either multimedia or a control word, between a security processor and a terminal includes, at the security processor, building a current session key by root key diversification as a function of a parameter transmitted by the terminal, decrypting the data, encrypting it with the session key, and transmitting it, and at the terminal, decrypting it using a secret code to obtain plain data, recording, in advance, secret codes, each enabling decryption of only data encrypted by a corresponding session key obtained by root-key diversification with a parameter, which can be the transmitted parameter, receiving the parameter in a message that also contains the data to be decrypted by the security processor, and in response, selecting, from the secret codes, a code for decrypting the data encrypted with the session key, as a function of the parameter or another parameter in the message.

11 Claims, 3 Drawing Sheets

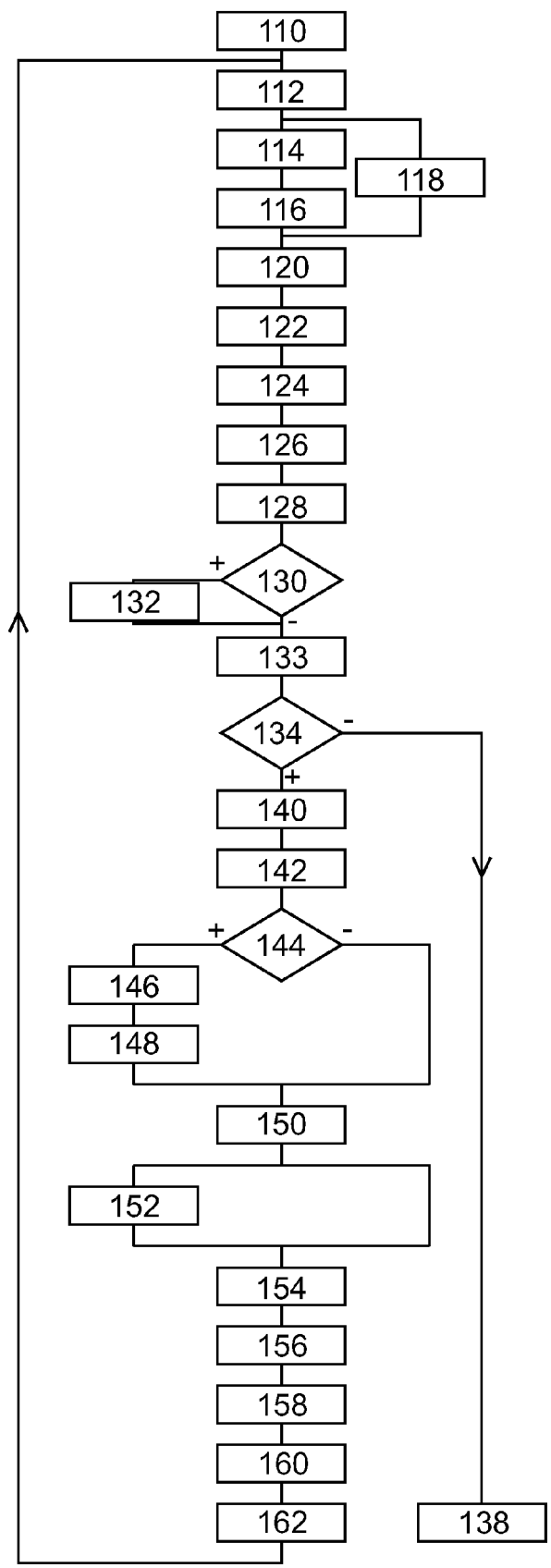
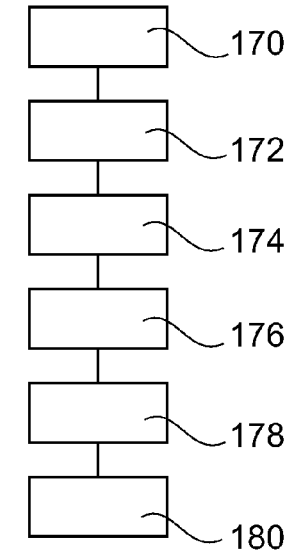
Fig. 6
Fig. 5

PROTECTION METHOD, DECRYPTION METHOD, RECORDING MEDIUM AND TERMINAL FOR SAID PROTECTION METHOD

CROSS-REFERENCE TO RELATED APPLICATIONS

This application is the National Stage of International Application No. PCT/EP2011/060258, filed on Jun. 20, 2011, which claims the benefit of the priority date of French Application No. 1054943, filed on Jun. 22, 2010. The content of these applications is hereby incorporated by reference in its entirety.

FIELD OF DISCLOSURE

This disclosure pertains to a method for protecting the transmission of multimedia content or a control word between a security processor and a terminal and to a method for decrypting multimedia content or a control word as well as to a recording medium and a terminal to implement the foregoing methods.

BACKGROUND

The term "multimedia content" herein designates a content to be displayed on a screen and/or to be played back via speakers. Typically, a multimedia content is a sequence of an audiovisual program such as a television broadcast or a film. To secure the transmission of multimedia contents towards terminals via a public network, the multimedia contents are scrambled with control words and then transmitted on this public network.

More specifically, a control word is a word encoded on several information bits used to scramble a cryptoperiod of the multimedia content. A cryptoperiod is a period of the multimedia content that is scrambled with the same control word and during which the rights of access to this multimedia content are not modified.

Here, the terms "scramble" and "encrypt" are considered to be synonyms. This is also the case for the terms "descramble" and "decrypt".

To secure the transmission of control words towards terminals by the intermediary of the public network, these control words are also encrypted before transmission, for example with a subscription key Ka.

A security processor is a processor that processes confidential information such as cryptographic keys or cryptographic algorithms. To preserve the confidentiality of this information, such a processor is designed to be as robust as possible against attack attempts conducted by computer hackers. It is therefore more robust against these attacks than other components of the terminal. In many applications, this security processor is detachable, i.e. it can easily be introduced into and removed from the terminal in alternation. In this case, it often takes the form of a chip card.

In the context of the scrambling of multimedia contents, the security processor contains secret information enabling the descrambling of the multimedia content received by a terminal. More specifically, there are two possible modes of operation for this security processor:

either the security processor itself descrambles the multimedia content and transmits the descrambled multimedia content to the terminal, or the security processor decrypts the control word and transmits the decrypted control word to the terminal.

If no precaution is taken, the descrambled multimedia content or the decrypted control word is transmitted in plain or unencrypted form from the security processor to the terminal.

The term "plain" or "in plain form" designates the state of a piece of information corresponding to its state before it is scrambled or encrypted by secret control words or secret keys. The plain multimedia content or plain control word transmitted on the interface between the security processor and the terminal is vulnerable. Attacks have been devised to exploit this vulnerability. For example, it has been proposed to pick up the plain control word on this interface and then illicitly broadcast it to other terminals.

To overcome this drawback, it has already been proposed to encrypt the multimedia content of the control word transmitted from the security processor to the terminal.

Thus, there are methods for protecting the transmission of a multimedia content or a control word between the security processor and the terminal wherein:

the security processor builds a current session key $SK_c$ by diversification of a root key SK_root as a function of a parameter $P_c$ transmitted by the terminal, the security processor decrypts the multimedia content or the control word and then encrypts the decrypted multimedia content or the decrypted control word with the current session key $SK_c$ and finally transmits the multimedia content or the control word encrypted with the current session key $SK_c$ to the terminal, and the terminal decrypts the multimedia content or the control word encrypted with the built key $SK_c$ by means of a secret code $C_c^{-1}$ to obtain the plain multimedia content or the plain control word.

For example, a method of this kind is disclosed in the patent application EP 1 867 096. In this prior art method, the parameter $P_c$ is an identifier of the terminal.

However, it can happen that the security of the current session key $SK_c$ gets compromised. For example, hacking attempts are made to discover this current session key and/or the root key SK_root from which it has been built.

If the security of the current session key has been compromised, it must be renewed. The renewal of a session key is a lengthy and complicated process. For example, in the system described in the patent application EP 1 867 096, it necessitates the renewal of the root key SK_root in each security processor and the renewal of the cryptogram SK_H* or SK_S* in each terminal. This renewal can only be done individually by addressing each terminal, and this is a particularly lengthy process which cannot be carried out simultaneously for all the terminals. The changing of the session key also calls for the sending of several messages to the same terminal, including especially a message to replace the cryptogram SK_H* or SK_S* and a message to replace the key SK_root. Furthermore, the messages addressed individually to each terminal can easily be filtered so that they are eliminated. Thus, an ill-intentioned user can easily prevent the renewal of his session key.

The prior art also includes the known patents EP0889956A2 and US2009/238363A1.

SUMMARY

The invention seeks to overcome at least one of these drawbacks. An object of the invention therefore is a method for protecting the transmission of a multimedia content or control word between a security processor and a terminal wherein the method comprises:

the advance recording in the terminal of several secret codes $C_i^{-1}$, each secret code $C_i^{-1}$ enabling solely the decryption of the multimedia content or of the control word encrypted with a respective session key $SK_i$ obtained by diversification of the key SK_root with a parameter $P_i$, one of the parameters $P_i$ being the parameter $P_c$, the reception of the parameter $P_c$ by the terminal in a message also containing a multimedia content or a control word to be decrypted by the security processor, and in response to the reception of the parameter $P_c$, the selection by the terminal from among the set of recorded secret codes of the secret code $C_c^{-1}$ to be used to decrypt the multimedia content or the control word encrypted with the secret key $SK_c$, as a function of the parameter $P_c$ or another parameter contained in the same message.

In the above method, the changing of the session key is faster because the parameter or parameters used to renew the session key both in the security processor and in the terminal are transmitted in the same message. Thus, a single message is sufficient to activate the changing of the session key. Furthermore, these parameters are contained within the same message as the one containing the scrambled multimedia content or the encrypted control word. Thus, if this message is eliminated to prevent the renewal of the session key, the descrambling of the multimedia content is made impossible since the scrambled multimedia content or the encrypted control word needed for this purpose is not transmitted to the security processor.

Finally, each terminal already contains several secret codes in advance, enabling each of them to decrypt the multimedia content or control word encrypted with a session key $SK_i$ different from the other session keys. Thus, the session key can be changed instantaneously without any transitory period during which the former session key is no longer usable while the new session key is not yet available.

The embodiments of this protection method may comprise one or more of the following characteristics:

each secret code $C_i^{-1}$ is a code directly executable or interpretable by the terminal, this terminal being already parameterized by its session key $SK_i$ so that it does not have to be parameterized again by this key $SK_i$ during its execution or interpretation;

each secret code $C_i^{-1}$ is a key $SK_i$ or a cryptogram of this key $SK_i$ making it possible to decrypt the multimedia content or the control word encrypted with the key $SK_i$ when it is used to parameterize a decryption algorithm pre-recorded in the terminal;

the message containing the parameter $P_c$ is an ECM (Entitlement Control Message);

the security processor transmits the multimedia content or control word encrypted twice, once by a specific key determined independently of the parameter $P_c$ and once by the session key $Sk_c$;

the processor verifies the presence of the parameter $P_c$ in the message transmitted and, if the parameter $P_c$ is absent, the processor does not encrypt the multimedia content or the control word with the current session key $Sk_c$;

the secret code or codes $C_c^{-1}$ are transmitted to the terminal before reception of the message containing the parameter $P_c$ by means of a EMM (Entitlement Management Message).

These embodiments of the protection method furthermore have the following advantages:

when the code is an executable code or a interpretable code, then compromising this code gives no information on the root key or the cryptographic algorithm implemented to make the other secret keys that are executable or interpretable, the use of an ECM message to transmit the parameter $P_c$ enables very frequent renewal of this session key, transmitting the encrypted multimedia content or control word twice increases the security of the system.

An object of the invention is also a method for decrypting a multimedia content or a control word by means of a terminal to put into practice the above method, the method comprising:

the transmission of the parameter $P_c$ to a security processor capable of decrypting the multimedia content or the control word, the reception by the terminal of the multimedia content or the control word encrypted with a current session key $SK_c$ built by the security processor through diversification of a root key SK_root as a function of the parameter $P_c$ transmitted by the terminal, the decrypting by the terminal of the multimedia content or of the control word encrypted with the key $SK_c$ by means of a secret code $C_c^{-1}$ to obtain the plain multimedia content or the plain control word, the advance recording in the terminal of several secret codes $C_i^{-1}$, each secret code $C_i^{-1}$ enabling solely the decrypting of the multimedia content or of the control word encrypted by a respective session key $SK_i$ obtained by diversification of the key SK_root with a parameter $P_i$, one of these parameters $P_i$ being the parameter $P_c$, the reception of the parameter $P_c$ by the terminal in a message also containing a multimedia content or a control word to be decrypted by the security processor, and in response to the reception of the parameter $P_c$, the selection by the terminal from among all the recorded secret codes, of the secret code $C_c^{-1}$ to be used to decrypt the multimedia content or the control word encrypted with the key $SK_c$ as a function of the parameter $P_c$ or any other parameter contained in the same message.

An object of the invention is also an information-recording medium comprising instructions to implement one of the above methods, when these instructions are executed by an electronic computer.

Finally, an object of the invention is also the terminal for decrypting an encrypted multimedia content or an encrypted control word, the terminal being capable of:

transmitting a parameter $P_c$ to a security processor capable of decrypting the multimedia content or the control word, receiving the multimedia content or control word encrypted with a current session key $SK_c$ built by the security processor by diversification of a root key SK_root as a function of the parameter $P_c$ transmitted by the terminal, decrypting the multimedia content or the control word encrypted with the key $SK_c$ by means of a secret code $C_c^{-1}$ to obtain the plain multimedia content or the plain control word, wherein:

the terminal comprises a memory in which several secret codes $C_i^{-1}$, are recorded in advance, each secret code $C_i^{-1}$ enabling solely the decryption of the multimedia content or control word encrypted by a respective session key $SK_i$ obtained by diversification of the key SK_root with a parameter $P_i$, one of these parameters $P_i$ being the parameter $P_c$, and the terminal is capable of:

receiving the parameter $P_c$ in a message also containing the multimedia content or the control word to be decrypted by the security processor, and selecting, from the set of secret codes recorded, the secret code $C_c^{-1}$ to be used to decrypt the multimedia content or control word encrypted with the key $SK_c$ as a function of the parameter $P_c$ or another parameter contained in the same message, in response to the reception of the parameter $P_c$.

DESCRIPTION OF THE FIGURES

The invention will be understood more clearly from the following description, given purely by way of a non-exhaustive example and made with reference to the appended drawings, of which:

FIG. 5 is a flowchart of a method for transmitting and receiving scrambled multimedia content implemented by means of the system of FIG. 1, and FIG. 6 is a flowchart of a method for recording secret codes in a terminal of the system of FIG. 1.

In these figures, the same references are used to designate the same elements.

DETAILED DESCRIPTION

Here below in this description, the characteristics and functions well known to those skilled in the art shall not be described in detail. Furthermore, the terminology used is that of systems of conditional access to multimedia contents. For further information on this terminology, the reader may refer to the following document:

<<Functional Model of Conditional Access System>>, EBU Review, Technical European Broadcasting Union, Brussels, BE, no 266, 21 Dec. 1995.

Figure 1:
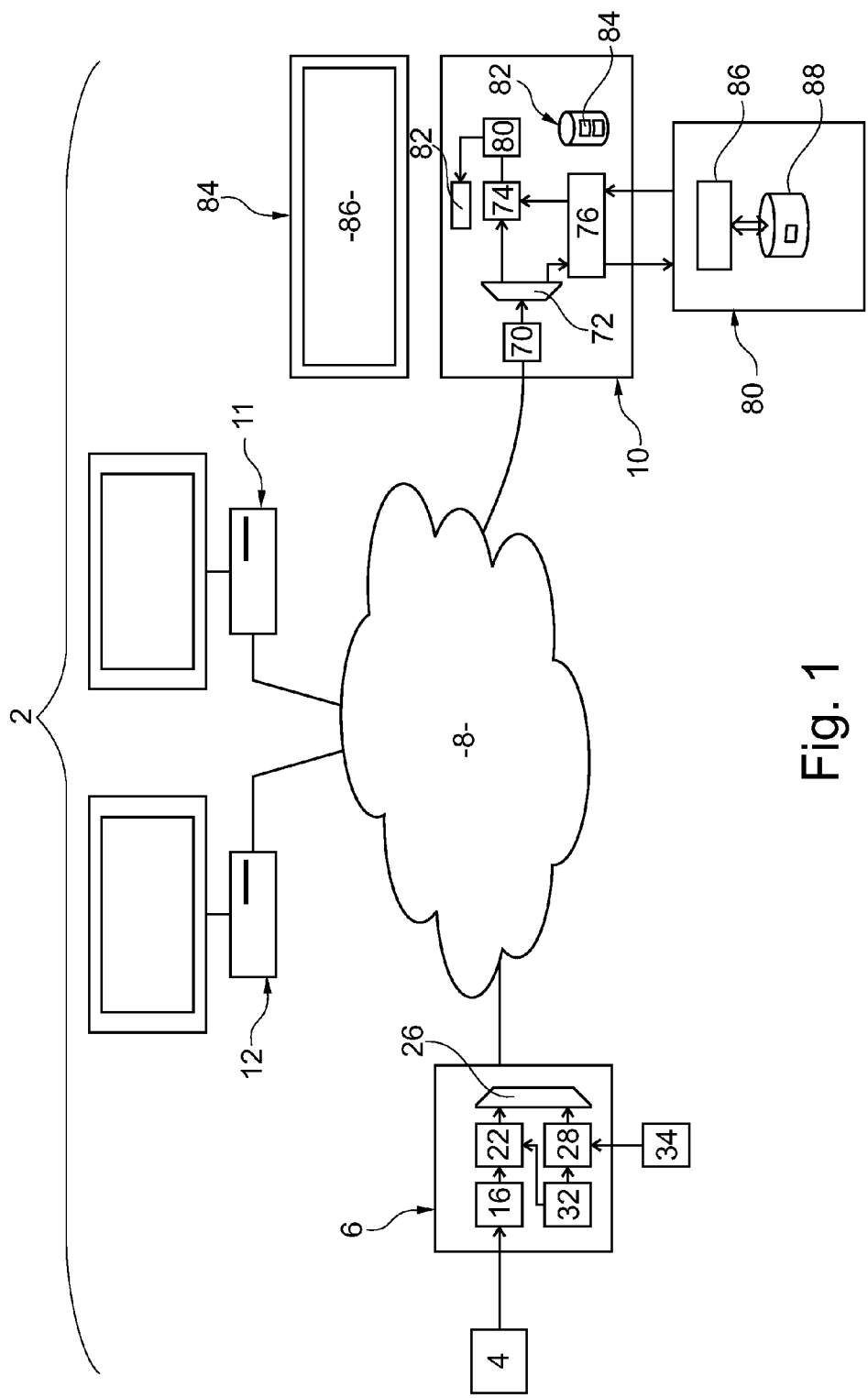
FIG. 1 is a schematic illustration of a system for transmitting and receiving scrambled multimedia contents.

FIG. 1 shows a system 2 for sending and receiving scrambled multimedia contents. For example, each multimedia content corresponds to a sequence of an audiovisual program such as a television broadcast or a film.

The plain multimedia contents are generated by one or more sources 4 and transmitted to a broadcasting device 6. The device 6 broadcasts the multimedia contents simultaneously towards a multitude of reception terminals through an information transmission network 8. The broadcast multimedia contents are time-synchronized with one another, for example to comply with a preset program schedule.

The network 8 is typically a long-distance information transmission network such as the Internet or a satellite network or any other type of broadcasting network such as the one used to transmit digital terrestrial television (DTTV).

To simplify FIG. 1, only three reception terminals 10 to 12 are shown.

The device 6 comprises an encoder 16 which compresses the multimedia contents that it receives. The encoder 16 processes the digital multimedia contents. For example, this encoder works in compliance with the MPEG2 (Moving Picture Expert Group-2) standard or the UIT-T H264 standard.

The compressed multimedia contents are sent towards an input of a scrambler 22. The scrambler 22 scrambles each compressed multimedia content to make its viewing conditional on certain conditions such as the purchase of a title of access by the users of the reception terminals. The scrambled multimedia contents are rendered at an output connected to the input of a multiplexer 26.

The scrambler 22 scrambles each compressed multimedia content by means of a control word $CW_{j,t}$ that is given to it as well as to a conditional access system 28 by a key generator 32.

The system 28 is known as a CAS (Conditional Access System).

The index j is an identifier of the channel on which the scrambled multimedia content is broadcast and the index t is an identifier of the cryptoperiod scrambled with this control word. Here below in this description, the cryptoperiod currently scrambled by the terminals is the cryptoperiod t−1.

Typically, this scrambling is compliant with a standard such as the DVB-CSA (Digital Video Broadcasting-Common Scrambling Algorithm), ISMA Cryp (Internet Streaming Media Alliance Cryp), SRTP (Secure Real-time Transport Protocol), AES (Advanced Encryption Standard) etc.

The system 28 generates ECMs (Entitlement Control Messages) containing at least the cryptogram $CW^*_{j,t}$ of the control word $CW_{j,t}$ generated by the generator 32 and used by the scrambler 22 to scramble the cryptoperiod t of the channel j. These ECM messages and the scrambled multimedia contents are multiplexed by the multiplexer 26, these contents being respectively given by the conditional access system 28 and by the scrambler 22 and then being transmitted on the network 8.

The system 28 is also capable of inserting two parameters $P_i$ and $Px_i$ into the ECM.

Figure 3:
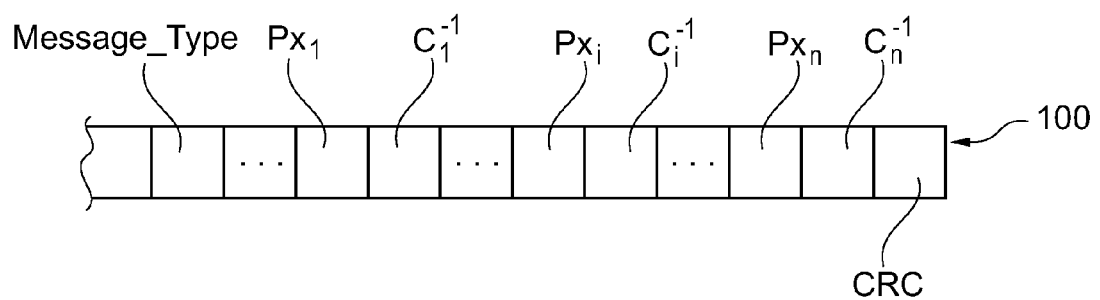
FIG. 3 is a schematic and partial illustration of an EMM (Entitlement Management Message) used in the system of FIG. 1.

The system 28 also generates EMMs (Entitlement Management Messages) such as the one illustrated in FIG. 3.

By way of an illustration here, the scrambling and the multiplexing of the multimedia contents is compliant with the DVB-Simulcrypt (ETSI TS 103 197) protocol.

The system 28 is also connected to a unit 34 for managing the renewal of the session keys. This unit 34 gives the system 28 the parameters $P_i$, $Px_i$ as well as associated secret codes $C_i^{-1}$. These parameters and these codes are described in greater detail here below.

For example, the terminals 10 to 12 are identical and only the terminal 10 is described in greater detail.

The terminal 10 has a receiver 20 of broadcast multimedia contents. This receiver 70 is connected to the input of a demultiplexer 72 which firstly transmits the multimedia content to a descrambler 74 and secondly transmits the ECMs and EMMs (Entitlement Management Messages) to a security module 76.

The descrambler 74 descrambles the scrambled multimedia content from the control word transmitted by the module 76. The descrambled multimedia content is transmitted to a decoder 80 which decodes it. The decompressed or decoded multimedia content is transmitted to a graphic card 82 which drives the display of this multimedia content on a display unit 84 equipped with a screen 86.

The display unit 84 displays the multimedia content on the screen 86 in plain form.

The module 76 manages the information exchanges with a detachable security processor 80. In particular, it cooperates with the processor 80 to protect the interface between this processor 80 and the terminal 10. To this end, this module 76 is interposed in the stream of information transmitted from the terminal 10 to the processor 80 and vice versa. The module 76 is made, for example, with a programmable electronic computer. It is connected to a memory 82 comprising all the instructions and data needed to execute the methods of FIGS. 5 and 6. This memory 82 therefore has especially the following elements:

- an identifier D-ID of the terminal 10 enabling the identification of this terminal 10 from among all the terminals of the system 2,
- a cryptogram TSK* of a session key TSK obtained by diversification of a root key TSK_root with the identifier D_ID.
- a personal key Ki enabling the decryption of the cryptogram TSK*,
- a table 84 associating a secret code $C_i^{-1}$ with each parameter $Px_i$ enabling the decryption of a piece of information encrypted with a current session key $SK_i$, and
- the codes $C_i^{-1}$.

In this embodiment, each code $C_i^{-1}$ is a code of a function of decryption of the information encrypted with a respective session key $SK_i$. Each code $C_i^{-1}$ is directly executable by the module 16. Each code $C_i^{-1}$ corresponds to a decryption function accepting the information to be decrypted as the sole parameter. This code is therefore already parameterized with the session key $SK_i$. This session key $SK_i$ is obtained by diversification of a root key SK_root by means of a parameter $P_i$.

The processor 80 is also made with an electronic computer 86 implementing an information encryption and decryption module. To this end, the processor 80 also has a memory 88 connected to the computer 86. This memory 88 is a secured memory containing especially the secret information needed to execute the method of FIG. 5. In particular, this method contains inter alia:

- titles of access to one or more multimedia contents,
- one or more subscription keys Ka,
- the root key TSK_root,
- the root key SK_root, and
- instructions to execute the method of FIG. 5.

Figure 2:
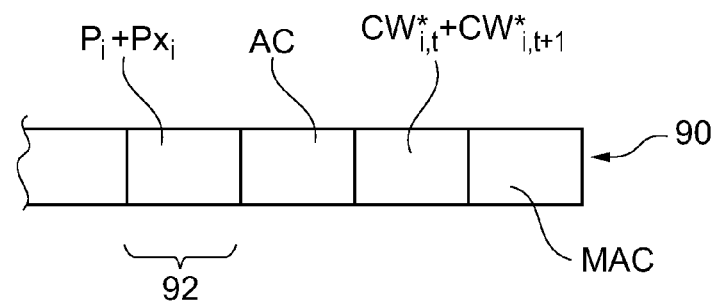
FIG. 2 is a schematic and partial illustration of an ECM message used in the system of FIG. 1.

FIG. 2 shows a portion of a frame of an ECM 90 capable of being generated by the system 28. This ECM contains especially a field 92 containing the parameters $P_i$ and $Px_i$. The parameter $Px_i$ can be all or part of the parameter $P_i$ and vice versa. The role of these parameters $P_i$ and $Px_i$ is described in greater detail with reference to FIG. 5.

Classically, this ECM 90 also contains:
- the identifier j of the channel,
- the cryptograms $CW^*_{j,t}$ and $CW^*_{j,t+1}$ of the control words $CW_{j,t}$ and $CW_{j,t+1}$ enabling the cryptoperiods t and t+1 of the channel j to be descrambled,
- rights of access DA to be compared with titles of access acquired by the user, and
- a signature or a cryptographic redundancy MAC to verify the integrity of the ECM.

FIG. 3 gives a schematic and partial view of an EMM 100 capable of being generated by the system 28. This EMM 100 contains especially a Message Type identifier to indicate the fact that this EMM is intended for the terminal and not for the security processor.

This message 100 also contains:
- several codes $C_i^{-1}$ where i ranges from 1 to n, n being an integer strictly greater than or equal to two,
- the parameters $Px_i$, each of these parameters being associated with the corresponding code $C_i^{-1}$, and
- a CRC code enabling the integrity of the message 100 to be verified.

Figure 4:
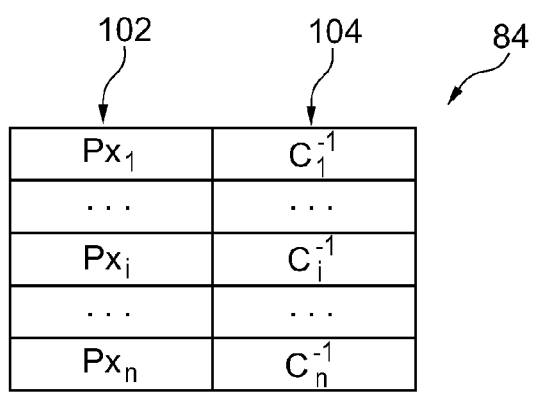
FIG. 4 is an illustration of a table also used in the system of FIG. 1.

FIG. 4 shows a possible example of a structure of the table 84. This table 84 has two columns 102 and 104. The column 102 includes the parameter $Px_i$ while the column 104 includes the corresponding associated code $C_i^{-1}$ or the address in the memory 82 of this code $C_i^{-1}$.

The working of the system 2 shall now be described with reference to the method of FIG. 5.

Initially, during an initialization phase 110, the processor 80 is inserted into the terminal 10. In response, the terminal 10 sends its identifier D-ID to the processor 80. This processor 80 then generates a session key TSK. This session key TSK is obtained by diversification of the root key TSK_root recorded in the memory 88.

The details on the encryption or decryption of control words by means of this session key TSK are not described here in detail. Indeed, the method of encryption of the control words on the interface between the processor 80 and the terminal 10 is the same here as the one described in the patent application EP 1 867 096. Thus, the reader may refer to this patent application for further information.

During the initialization phase, the processor 80 also receives, for example through EMMs, access titles and subscription keys Ka. These access titles and keys Ka enable it to decrypt the cryptograms of the control words of the channels for which it has taken out a subscription with an operator.

The transmission of a multimedia content from the device 6 to a terminal shall now be described in the particular case of the terminal 10.

During a step 112, the generator 32 generates a control word which is transmitted to the scrambler 22 and to the system 28.

At a step 114, this control word is encrypted with a subscription key Ka to obtain a cryptogram $CW^*_{Ka}$. For example, the key Ka is renewed once a month.

Then, at a step 116, the system 28 generates an ECM containing the cryptogram $CW^*_{Ka}$ as well as the corresponding rights of access. If necessary, this ECM also contains parameters $P_c$ and $Px_c$ if the level of security of the protection of the interface between the processor 80 and the terminal 10 needs to be boosted. The parameters $P_c$ and $Px_C$ are chosen from among the pairs of parameters $P_i$ and $Px_i$ used to create the table 84.

At the same time, during a step 118, the control word generated is transmitted to the scrambler 22 which scrambles the cryptoperiod of the multimedia content by means of this control word before transmitting the scrambled cryptoperiod to the multiplexer 26.

At a step 120, the multiplexer 26 multiplexes the ECMs generated with the scrambled multimedia content and then broadcasts them to all the terminals of the system 2 by means of the network 8.

At a step 122, the terminal 10 receives the signals broadcast by the device 6 through its receiver 70. At a step 124, these signals are demultiplexed by the demultiplexer 72.

At a step 126 the scrambled multimedia content is transmitted to the descrambler 74.

At a step 128, the ECMs and EMMs for their part are transmitted to the security module 76.

At a step 130, the module 76 checks to see if new parameters $P_c$, $Px_c$ are present in the ECM received. "New parameters" $P_c$, $Px_c$ are parameters $P_c$, $Px_c$ having values different from those received earlier.

If the response is affirmative, the module carries out the step 132 during which it extracts the parameter $Px_c$ and then selects the code $C_c^{-1}$ associated with this parameter by means of the table 84.

At the end of the step 132 or should the ECM comprise no parameter $P_c$, $Px_c$ or new parameters $P_c$, $Px_c$, then at a step 133, the module 76 transmits the ECM received to the processor 80. At a step 134, the processor 80 compares the access titles contained in the memory 88 with the access rights contained in the ECM received.

If the access titles do not correspond to the access right, then the processor 80 carries out a step 138 to inhibit the descrambling of the multimedia content received. For example, to this end, it does not transmit the control word needed to descramble the multimedia content to the terminal 10. If not, at the step 140, the processor 80 decrypts the cryptogram $CW^*_{Ka}$ with the key Ka so as to obtain the control word CW in plain form.

Then, at a step 142, the computer 86 encrypts the control word CW by means of the session key TSK recorded in the memory 88 and generated during the phase 110. The cryptogram $CW^*_{TSK}$ is then obtained.

At a step 144, the processor 80 checks to see if a parameter $P_c$ is present in the received ECM.

If the response is affirmative, the processor 80 then carries out a step 146 during which it builds the new session key $SK_c$ by diversification of the root key SK_root by means of the parameter $P_c$ received. The step 146 is performed only when it is a new parameter $P_c$. If the parameter $P_c$ has already been received, the key $SK_c$ has already been built and it is possible to proceed directly to the next step.

Then, at a step 148, it encrypts the cryptogram $CW^*_{TSK}$ by means of the key $SK_c$ to obtain a cryptogram $CW^{}_{(TSK)(SKc)}$. This cryptogram $CW^{}_{(TSK)(SKc)}$ corresponds to the control word encrypted twice, once by the key TSK and once by the key $SK_c$. In this case, it is also said that the control word CW is over-encrypted with the key $SK_c$.

At the end of the step 148 or should the received ECM include no parameter $P_c$, then at a step 150, the processor 80 transmits the cryptogram of the control word to the terminal 10. Depending on whether the steps 146, 148 have been executed or not, this cryptogram is either the cryptogram $CW^{**}_{(TSK)(SKc)}$ or the cryptogram $CW^*_{TSK}$.

Then, if the parameter $Px_c$ is present in the received ECM, during a step 152, the module 76 decrypts the cryptogram $CW^{}_{(TSK)(SKc)}$ in executing the code $C_c^{-1}$ selected during the step 132. More specifically, in this second step, the code $C_c^{-1}$ receives only the cryptogram $CW^{}_{(TSK)(SKc)}$ to be deciphered as an input parameter. At this stage, it is not necessary for it to be also parameterized with the session key $SK_c$ since this parameter is already integrated into the executable code. At the end of the step 152, the cryptogram $CW^*_{TSK}$ is obtained from the cryptogram $CW^{**}_{(TSK)(SKc)}$.

After the step 152 or if the control word transmitted by the processor 80 has been encrypted only once, then at a step 154 the module 76 decrypts the cryptogram $CW^*_{TSK}$ by means of the key TSK. At this step 154, the key TSK is for example obtained by decrypting a cryptogram of this key stored in the memory 82 by means of its personal key $K_i$. At the end of the step 154, the plain control word CW is obtained.

At a step 156, the module 76, transmits this plain control word CW to the descrambler 74 which then descrambles the corresponding cryptoperiod of the scrambled multimedia content with this control word.

At a step 158, the descrambled multimedia content is transmitted to the decoder 80 which decodes it.

At a step 160, the graphic card receives the decoded multimedia content and commands its display on the screen 86. Thus, at a step 162, the plain multimedia content is displayed on the screen 86.

In the method of FIG. 5, when the protection of the interface between the processor 80 and the terminal 10 needs to be boosted, it is enough to insert parameters $P_c$ and $Px_c$ into an ECM. From this instant onwards, the control word transmitted from the processor 80 to the terminal 10 is encrypted twice instead of only once. Furthermore, to change the session key $SK_c$, it is enough to change the parameters $P_c$ and $Px_c$ contained in the ECM. However, this change in session key $SK_c$ entails the assumption that the corresponding codes $C_c^{-1}$ have been recorded preliminarily in the memory 82. This is done by means of the method of the following FIG. 6.

When the security has to be boosted, then at a step 170, several pairs of parameters $P_i$, $Px_i$ are chosen.

Then, at a step 172, the unit 34 builds a session key $SK_i$ for each parameter $P_i$ chosen at the step 170. Here, each key $SK_i$ is obtained by diversification of the root key SK_root as a function of the parameter $P_i$. One example of a method of diversification is described in the patent application EP 1 867 096.

Then, at a step 174, these codes $C_i^{-1}$ used to decrypt the cryptograms obtained with the keys $SK_i$ are generated. For example, to this end, for each code $C_i^{-1}$ the same decrypting algorithm as the one used by the processor 80 is parameterized with the key $SK_i$ and then compiled by means of a compiler. Preferably, the executable code is made robust against crypto-analysis attempts aimed for example at identifying the session key, the root key or the algorithm used to decrypt the messages. For example, to this end, the teaching of the following document is implemented:

S. Chow, P. Eisen, H. Johnson, P. C. Van Oorchot, "White Box Cryptography And an AES Implementation", Proceedings of SAC 2002, 9th Annual Workshop on Selected Area in Cryptography, Aug. 15-16 2002, Saint John's, Canada.

Once the codes $C_i^{-1}$ have been generated, then at a step 176, these codes are transmitted with the corresponding parameters $Px_i$ to the system 28 of the device 6. To this end, the system 28 generates an EMM such as the EMM 100 which is then multiplexed with the scrambled multimedia content and broadcast simultaneously to all the terminals of the system 2.

In response to the reception of this EMM 100, at a step 178, this message is transmitted to the security module 76. At a step 180, the security module 76 updates the table 84 using information contained in this EMM and records the codes $C_i^{-1}$ in the memory 82.

From this time onwards, the over-encryption of the control words with one of the keys $SK_i$ can be activated and the changing of the over-encryption key can be also made rapidly and frequently.

Many other embodiments are possible. For example, the codes $C_i^{-1}$ are not necessarily executable codes and may be replaced by codes that are directly interpretable by a virtual machine implemented in the terminal 10. Typically, this virtual machine is a Java® virtual machine.

The code $C_i^{-1}$ is not necessarily an executable or interpretable code. As a variant, the code $C_i^{-1}$ is a key $SK_i$ or a cryptogram of this key $SK_i$.

The parameters $P_i$ and $Px_i$ may constitute all or part of a same parameter. In particular, the parameter $Px_i$ can be identical to the parameter $P_i$. In this variant, only the parameter $P_i$ is then transmitted.

The parameters $P_i$ or $Px_i$ can be the object of various operations before they are used by the terminal or the processor 80. For example, these parameters can be used as a seed serving to initialize a generator of pseudorandom numbers. It is then the generated pseudorandom number that is used to diversify the root key SK_root or used by the module 76. In another variant, only one parameter $Px_i$ and the associated code $C_i^{-1}$ are sent to the terminals before the use of the key $SK_i$. Thus, the memory 82 only has the code $C_i^{-1}$ and the code $C_i^{-1}$ which will be used immediately after the code $C_c^{-1}$. This prevents the unnecessary exposure of the other codes $C_i^{-1}$ that could be used.

The changing of the key $SK_c$ can come into play immediately as described here above or after a predetermined number of cryptoperiods received after the reception of the message containing the new parameter $P_c$.

In another variant, the first encryption of the control word by means of the key TSK is not implemented. In this case, the control word is encrypted solely by means of the session key $SK_c$.

The security processor is not necessarily detachable. For example, it is fixed without any degree of freedom inside the terminal 10.

The security processor does not necessarily take the form of a chip card. For example, it can also take the form of an USB (Universal Serial Bus) stick. In another variant, it is not detachable but integrated into the terminal casing.

The elements of the terminal 10 are not necessarily contained in a same casing. For example, these elements can be distributed over a local area network. In this case, typically, a casing receiving the signal transmitted by the device 6 uses the processor 8 to decrypt the control words and to encrypt them by means of the session key $SK_c$. The control words thus encrypted are then transmitted through the local area network to one or more casings placed for example in proximity to display screens. These other casings each incorporate a security module, for example one that is identical to the module 76 previously described so as to be able to decrypt and obtain in plain form the control word needed to descramble the received multimedia contents.

Finally, the system 2 has been described in the particular case where the processor 80 is used solely to decrypt the control words received. In another variant, the processor 80 descrambles the multimedia content and it is the descrambled multimedia content that is transmitted from the processor 80 to the terminal 10. In this variant, the encryption by means of the key $SK_c$ is applied to the multimedia content transmitted from the processor 80 to the terminal 10 and no longer applied to the control word since this word is no longer transmitted between the terminal 10 and the processor 80.

The invention claimed is:

1. A method for protecting transmission of one of multimedia content and a control word between a security processor and a terminal, said method comprising, at said security processor, building a current session key by diversification of a root key as a function of a particular parameter transmitted by said terminal, at said security processor, decrypting said one of multimedia content and a control word, encrypting said decrypted one of multimedia content and a control word with said session key, and transmitting said encrypted one of multimedia content and a control word, which is encrypted with said session key, to said terminal, and at said terminal, decrypting said one of multimedia content and a control word using a secret code to obtain a plain one of multimedia content and a control word, wherein said method further comprises, at said terminal, recording, in advance, a plurality of secret codes, each of which enables decryption of only data that has been encrypted by a corresponding session key that is obtained by diversification of said root key with a parameter from a set of parameters, one of which is said particular parameter transmitted by said terminal, at said terminal, receiving said particular parameter in a message that contains, in addition to said particular parameter, said one of multimedia content and a control word to be decrypted by said security processor, and at said terminal, in response to receiving said particular parameter, selecting, from among said set of recorded secret codes, a particular secret code to be used to decrypt said one of multimedia content and a control word encrypted with said session key, as a function of one of said particular parameter and an other parameter contained in said message.

2. The method of claim 1, wherein each secret code is a code that can be one of directly executed by said terminal and directly interpreted by said terminal, said terminal having already been parameterized by a session key thereof, thereby avoiding a requirement of re-parameterization by said session key during said one of execution and interpretation of said code.

3. The method according to claim 1, wherein each secret code is selected from a group consisting of a key and a cryptogram of said key, thereby enabling decryption of data encrypted with said key when said key is used to parameterize a decryption algorithm pre-recorded in said terminal.

4. The method of claim 1, wherein receiving said particular parameter in a message comprises receiving an entitlement control message.

5. The method of claim 1, wherein at said security processor, transmitting said encrypted one of multimedia content and a control word, which is encrypted with said session key, to said terminal comprises transmitting an encrypted one of multimedia content and a control word that has been encrypted twice, once with said session key and once with a specific key determined independently of said particular parameter.

6. The method of claim 1, wherein said security processor verifies presence of said particular parameter in said transmitted message, and, if said particular parameter is absent, said security processor does not encrypt said one of multimedia content and a control word with said current session key.

7. The method of claim 1, further comprising transmitting said secret codes to said terminal before receiving said message containing said particular parameter by means of an entitlement management message.

8. The method according to claim 1, wherein recording, in advance, a plurality of secret codes comprises recording more than two secret codes.

9. A method for decrypting one of multimedia content and a control word by means of a terminal, said method comprising transmitting a particular parameter to a security processor capable of decrypting said one of multimedia content and a control word, at said terminal, receiving said one of multimedia content and a control word, said one of multimedia content and a control word having been encrypted with a current session key built by said security processor through diversification of a root key as a function of said particular parameter transmitted by said terminal, at said terminal, decrypting said one of multimedia content and a control word that was encrypted with said session key by means of a secret code to obtain a plain one of multimedia content and a control word, wherein said method further comprises recording in advance, at said terminal, a plurality of secret codes, each of which enables decryption of said one of multimedia content and a control word that was encrypted by said session key obtained by diversification of said root key with a parameter from a set of parameters, one of said parameters in said set of parameters being said particular parameter, at said terminal, receiving said particular parameter in a message that comprises said one of multimedia content and said control word to be decrypted by said security processor, and in response to receiving said particular parameter, selecting, by said terminal, from among all said recorded secret codes, a particular secret code to be used to decrypt said one of multimedia content and said control word encrypted with said session key as a function of one of said particular parameter and an other parameter contained in said message.

10. A non-transitory computer-readable medium having encoded thereon instructions that are executable by an electronic computer, said instructions causing said computer to execute the method recited in claim 1.

11. A terminal for decrypting one of encrypted multimedia content and an encrypted control word, said terminal being configured for transmitting a particular parameter to a security processor capable of decrypting said one of encrypted multimedia content and an encrypted control word, receiving said one of encrypted multimedia content and an encrypted control word having been encrypted with a current session key built by said security processor by diversification of a root key as a function of said particular parameter transmitted by said terminal, decrypting said one of encrypted multimedia content and an encrypted control word encrypted with said session key by means of a secret code to obtain one of plain multimedia content and a plain control word, said terminal comprising a memory in which several secret codes have been recorded in advance, each secret code enabling decryption solely of one of multimedia content and a control word encrypted by a respective session key obtained by diversification of a root key with a parameter from a set of parameters, one of said parameters from said set of parameters being said particular parameter, and wherein said terminal is further configured for receiving said particular parameter in a message that comprises, in addition to said particular parameter, one of multimedia content and a control word to be decrypted by said security processor, and wherein said terminal is further configured for selecting, from said set of secret codes recorded in said memory, a particular secret code to be used to decrypt said one of multimedia content and a control word encrypted with said session key as a function of one of said particular parameter and an other parameter contained in said message in response to receiving said particular parameter.

* * * * *